(12) United States Patent
Lee

(10) Patent No.: US 6,525,789 B1
(45) Date of Patent: Feb. 25, 2003

(54) LIQUID CRYSTAL DISPLAY MODULE SUITABLE FOR A PORTABLE COMPUTER

(75) Inventor: Gwang Rok Lee, Taegu (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/458,467

(22) Filed: Dec. 9, 1999

(30) Foreign Application Priority Data

Dec. 12, 1998 (KR) .............................................. 98-54098

(51) Int. Cl.[7] .............................................. G02F 1/1333
(52) U.S. Cl. .............................. 349/58; 349/59; 349/60; 349/61; 349/65; 361/681
(58) Field of Search .............................. 349/58, 60, 59, 349/61, 62, 63, 64, 65; 361/681

(56) References Cited

U.S. PATENT DOCUMENTS

| 5,280,372 | A | * | 1/1994 | Horiuchi | 349/65 |
| 5,654,779 | A | * | 8/1997 | Nakayama et al. | 349/58 |
| 5,729,310 | A | * | 3/1998 | Horiuchi et al. | 349/62 |
| 5,835,139 | A | * | 11/1998 | Yun et al. | 349/58 |
| 5,926,237 | A | * | 7/1999 | Yun et al. | 349/58 |
| 6,002,457 | A | * | 12/1999 | Yun et al. | 349/58 |
| 6,008,870 | A | * | 12/1999 | Yun | 349/58 |
| 6,020,942 | A | * | 2/2000 | Yun et al. | 349/58 |
| 6,046,785 | A | * | 4/2000 | Won | 349/58 |
| 6,064,455 | A | * | 5/2000 | Kim | 349/113 |
| 6,219,116 | B1 | * | 4/2001 | Yuuki et al. | 349/58 |
| 6,292,239 | B1 | * | 9/2001 | Nagamura et al. | 349/58 |
| 6,373,537 | B2 | * | 4/2002 | Yun et al. | 349/58 |
| 6,392,724 | B2 | * | 5/2002 | An et al. | 349/58 |
| 6,421,231 | B1 | * | 7/2002 | Jung | 361/681 |
| 6,456,343 | B2 | * | 9/2002 | Kim et al. | 349/58 |

FOREIGN PATENT DOCUMENTS

| JP | 5-142559 | * | 6/1993 |
| JP | 5-289061 | * | 11/1993 |
| JP | 6-148602 | * | 5/1994 |
| JP | 6-222335 | * | 8/1994 |
| JP | 6-273789 | * | 9/1994 |

* cited by examiner

Primary Examiner—Kenneth Parker
Assistant Examiner—David Chung
(74) Attorney, Agent, or Firm—Birch, Stewart, Kolasch & Birch, LLP

(57) ABSTRACT

A liquid crystal display module includes a liquid crystal panel, a main frame for supporting the liquid crystal panel, and a lamp housing with a lamp for supplying light to the liquid crystal panel such that the lamp housing defines one side of the liquid crystal display module so as to further reduce the weight and size of the liquid crystal display module for use in a portable computer.

32 Claims, 5 Drawing Sheets

1

LIQUID CRYSTAL DISPLAY MODULE SUITABLE FOR A PORTABLE COMPUTER

This application claims the benefit of Korean Patent Application No. 98-54098, filed on Dec. 12, 1998, which is hereby incorporated by reference.

BACKGROUND OF THE INVENTION

1. Field of the Invention

The present invention relates to a liquid crystal display module and more specifically, to a liquid crystal display module having a much more compact structure that is especially suitable for use with a portable computer.

2. Description of the Related Art

Generally, a portable computer includes a liquid crystal display device as the monitor therein because the liquid crystal display device is compact. In recent years, liquid crystal display devices have also been used with desktop computers because liquid crystal display devices are compact and are capable of reducing eye fatigue and electromagnetic radiation.

FIG. 1 is an exploded perspective view of a conventional liquid crystal display module. A liquid crystal display module 110 includes a back light device 114 and a liquid crystal display panel 112. The back light device 114 and the liquid crystal display panel 112 are attached to each other via a main frame 115 and a top frame 116. The main frame 115 is made of a plastic material. The back light device 114 includes a reflective plate 114a, a waveguide plate 114b, a first diffuser/protecting sheet 114c, a first prism sheet 114d, a second prism sheet 114e, and a second diffuser/protecting sheet 114f, which are all stacked on each other in the above-described order. The main frame 115 is coupled to the top frame 116 with the liquid crystal panel 112 and the back light device 114 interposed therebetween. It should be noted, as seen in FIG. 1, the main frame 115 is a rectangular member having four interconnected side members which define the frame.

Referring to FIG. 2, a liquid crystal display module 110 is disposed between a front case 122 and a back case 124 when the liquid crystal module 110 is included in a laptop computer.

Referring to FIG. 3, which is a sectional view taken along the line III—III of FIG. 2, a lamp housing 118 is attached to the main frame 115. The lamp housing 118 with a lamp 117 is positioned at a top end of the light waveguide plate 114b and extends along a vertical portion 115b of the main frame 15. A flat wire 119 and the top frame 116 are disposed on the top surface of the lamp housing 118.

In order to attach the lamp housing 118 to the main frame 115, the thickness of the lower horizontal portion 115a of the main frame 115, which is underneath the lamp housing 118, and the vertical portion 115b of the main frame 115, which is adjacent to the lamp housing 118, is reduced. However, due to this arrangement, the thickness of the lower horizontal portion 115a and the vertical portion 115b is usually greater than 0.7 mm. Because the conventional main frame 115 has portions having a thickness that is greater than 0.7 mm., the liquid crystal display module is bulky and thick making it very difficult to minimize the dimensions of the device and making it much less compact than desired. As seen in FIG. 3, the lower horizontal portion 115a and the vertical portion 115b which are arranged to envelope the lamp housing 118, cause the overall dimension of the liquid crystal display to be significantly increased in both the horizontal and vertical directions.

SUMMARY OF THE INVENTION

To overcome the problems described above, preferred embodiments of the present invention provide a liquid crystal display module including a liquid crystal display panel which is significantly more compact than prior art devices while providing desired structural integrity.

Also, preferred embodiments of the present invention provide a liquid crystal display module having a unique arrangement of a main frame and lamp housing which allow the liquid crystal display module to have a significantly reduced size in vertical and horizontal dimensions.

According to one aspect of preferred embodiments of the present invention, a liquid crystal display module includes a main frame having three interconnected members defining a three-sided main frame, and a lamp housing connected to the three sided main frame so as to define a fourth side of the main frame.

According to a preferred embodiment of the present invention, a liquid crystal display module preferably includes a main frame having first and second longitudinal members that are substantially parallel to each other and a first lateral member arranged substantially perpendicular to the first and second longitudinal members and interconnected at a first end of the first and second longitudinal members such that the first and second longitudinal members and the first lateral member define three sides of the main frame, wherein the liquid crystal panel is disposed on the main frame such that the main frame supports the liquid crystal panel, and a lamp housing having a lamp for supplying light to the liquid crystal panel, wherein the lamp housing is coupled to second ends of the first and second longitudinal members such that the lamp housing defines a side of the main frame.

With this unique arrangement and structure of preferred embodiments of the preferred embodiments of the present invention, a liquid crystal display device having much lighter weight and greater compactness for use with a portable computer is achieved.

Other features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description of preferred embodiments provided hereinbelow and the accompanying drawings which are given by way of illustration only, and thus do not limit the present invention and wherein.

DETAILED DESCRIPTION OF PREFERRED EMBODIMENTS

Figure 4:
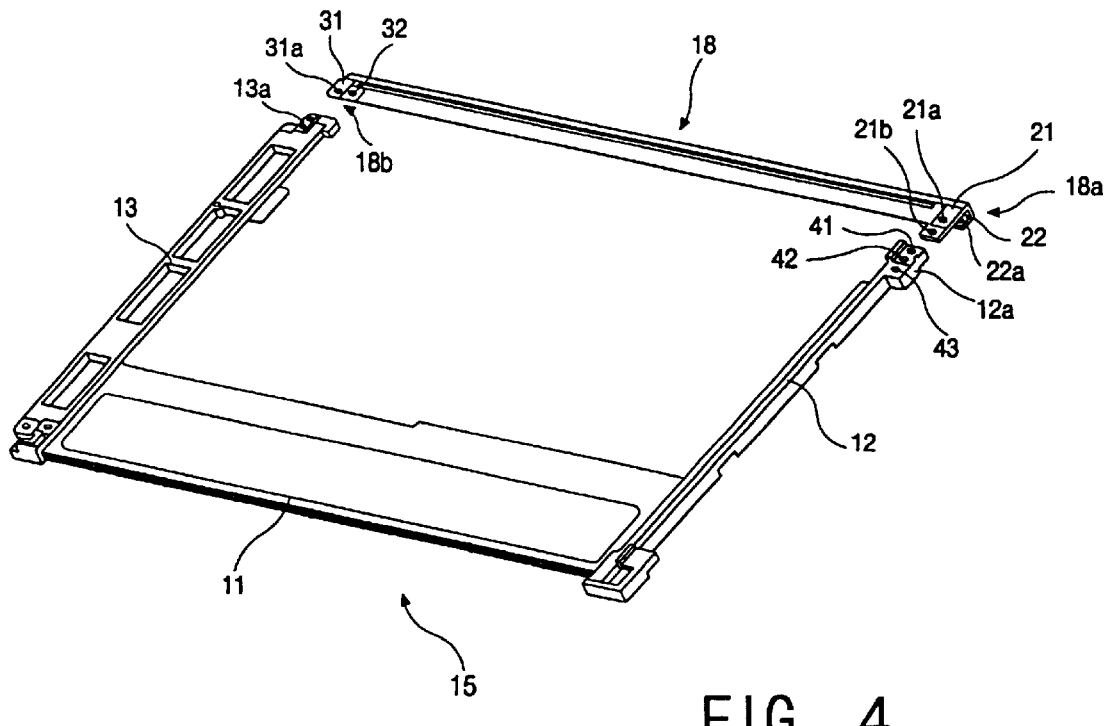
FIG. 4 is a perspective view of a disassembled main frame and a lamp housing of a liquid crystal display module according to a preferred embodiment of the present invention.

FIG. 4 is a perspective view of a disassembled main frame and a lamp housing of a liquid crystal display module according to a preferred embodiment of the present invention. Referring to FIG. 4, a main frame 15 preferably includes two substantially parallel longitudinal members 12 and 13 and a lateral member 11 interconnecting a first end of the longitudinal members 12 and 13. As is seen in FIG. 4, the two substantially parallel longitudinal members 12 and 14 and the lateral member 11 are connected to define a three-sided main frame 15. Thus, the main frame 15 does not include a lateral member that is opposite to the lateral member 11, as with conventional four-sided main frames.

A lamp housing 18 is provided and is preferably arranged to interconnect a second end of the longitudinal members 12 and 13. The lamp housing 18 defines a fourth side of the main frame 15. This unique structure provides significant space savings, compactness and ease of assembly as will be described below.

The lamp housing 18 may be connected to the longitudinal members 12, 13 of the main frame in many different ways and using many different connecting elements. For example, in the preferred embodiment shown in FIG. 4, coupling projections 18a and 18b are preferably provided on the opposite ends of the lamp housing 18 and arranged to be attached to coupling flanges 12a and 13a, which are provided on the second end of the longitudinal members 12 and 13, respectively. The coupling projection 18a preferably includes upper and lower engagement portions 21 and 22, respectively. The upper engagement portion 21 preferably has two screw holes 21a and 21b, while the lower engagement portion 22 preferably has one screw hole 22a. The coupling projection 18b preferably includes upper and lower engagement portions 31 and 32, respectively. The upper engagement portion 31 is also provided with two screw holes and the lower engagement portion 32 also has just one screw hole. The coupling flange 12a for coupling to the coupling projection 18a is preferably provided with three screw holes 41, 42 and 43, and is preferably stepped so as to correspond to the upper and lower engagement portions 22 and 21, respectively, of the coupling projection 18a.

Figure 5:
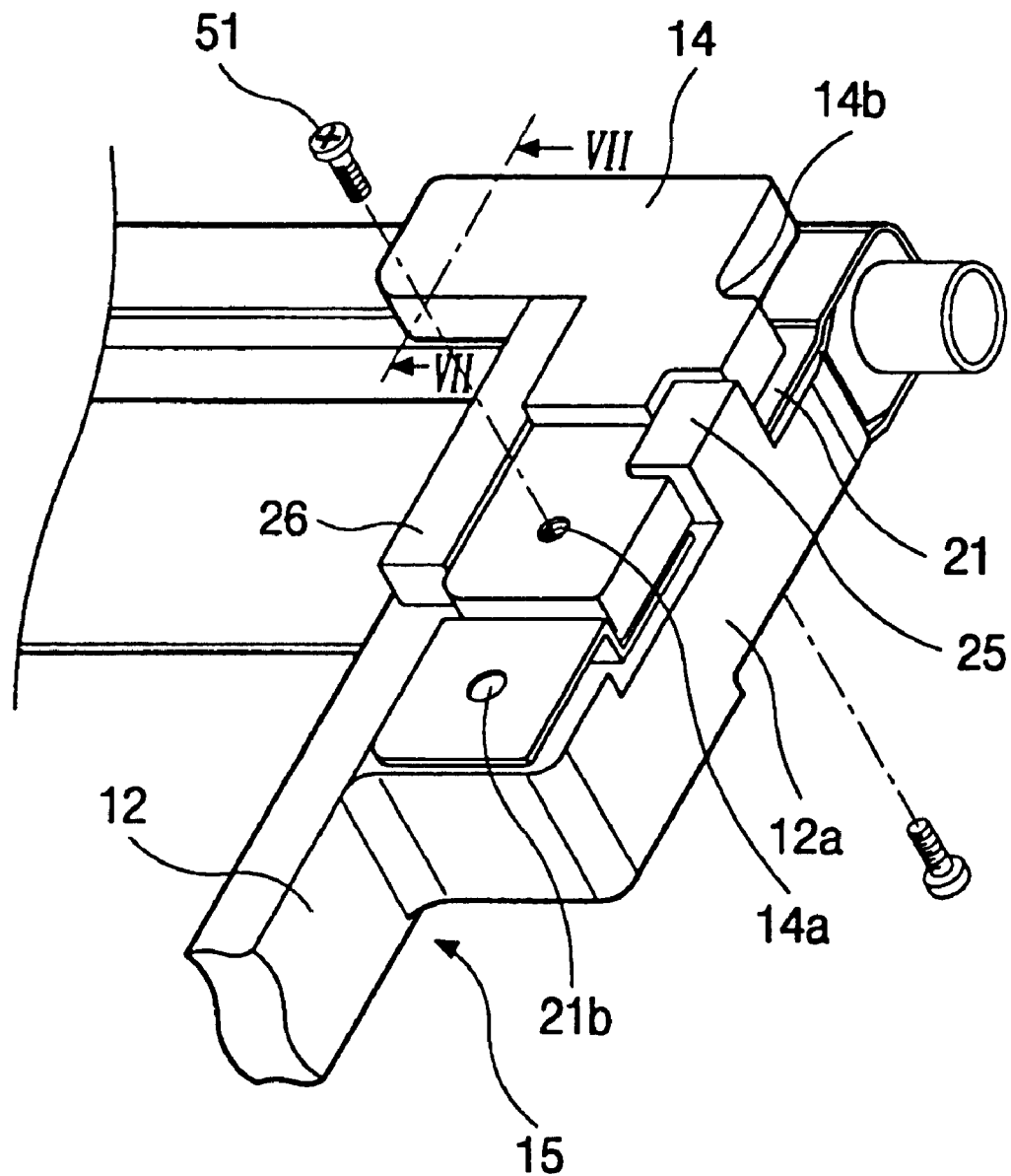
FIG. 5 is an enlarged partial perspective view of the lamp housing and the main frame of FIG. 4 when coupled together according to a preferred embodiment of the present invention.

FIG. 5 is an enlarged partial perspective view of the lamp housing 18 and the main frame 15 of FIG. 4 when coupled together. Referring to FIG. 5, a panel support 14 is disposed on the lamp housing 18 to compensate for the height of the LCD panel (not shown). The panel support 14 is provided with a screw hole 14a such that the screw hole 14a can be screw-coupled to the screw hole 21a of the coupling projection 18a. Note that the portion where the screw hole 14a is provided is indented inward to compensate for the height of the head portion of the screw 51 that is to be tightened into the screw hole 14a.

Further, the coupling projection 18a is coupled to the coupling flange 12a of the main frame 15 under the panel support 14 such that the screw holes 41, 42 and 43 of the main frame 15 are screw-coupled to the screw holes 22a, 21a and 21b of the lamp housing 18, respectively.

Figure 6:
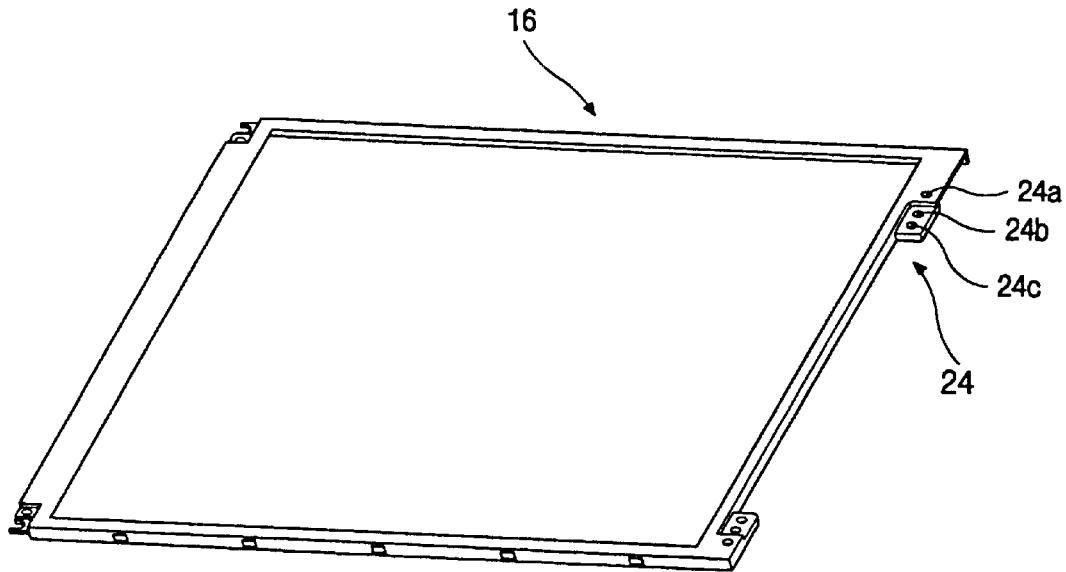
FIG. 6 is a perspective view of a top frame for coupling to the main frame of FIG. 4.

FIG. 6 shows a top frame 16 for being assembled to the main frame 15. Referring to FIG. 6, a top frame 16 is provided with a coupling flange 24 which corresponds to the coupling projection 18a of the lamp housing 18. The coupling flange 24 is preferably provided with three screw holes 24a, 24b and 24c. The screw hole 24a is coupled to the screw hole 21b of the coupling projection 18a of the lamp housing 18 as well as to the screw hole 43 that is provided on the coupling flange 12a of the main frame 15. The screw holes 24b and 24c are coupled to a hinge arm (not shown) that is pivotally connected to the main body.

Referring again to FIG. 5, a projection 25 extending upward from the coupling flange 12a of the main frame 15 is provided to prevent the deforming of the parts which is caused by torque generated when the screws are tightened. The panel support 14 is cut away at a portion 14b to provide a passage through which a lamp wire can pass. Note that a bar-shaped guide 26 is provided on the main frame 15 to support the LCD panel in a lateral direction.

Figure 7:
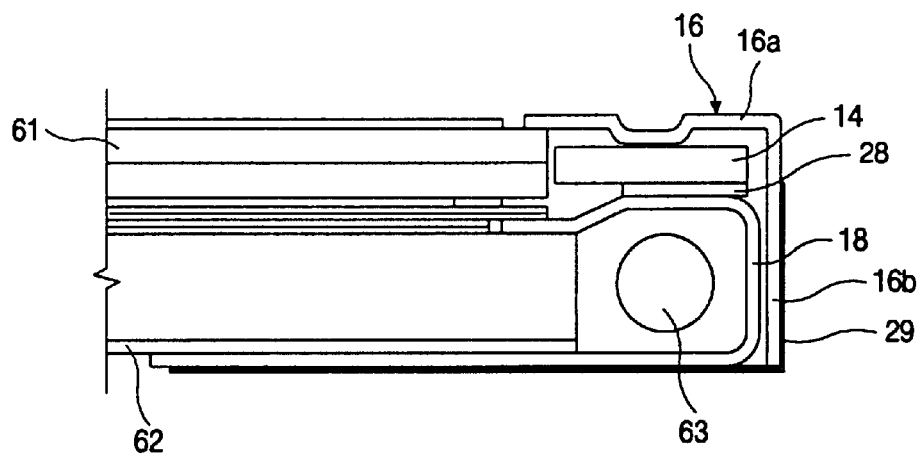
FIG. 7 is a cross-section view taken along the line VII—VII of FIG. 5, and which also shows components used for assembling that are not shown in FIG. 5.

FIG. 7 is a cross-section view taken along the line VII—VII of FIG. 5, and which also shows components used for assembling that are not shown in the perspective view of FIG. 5. The lamp housing 18, the panel support 14, and the top frame 16 are stacked in the above-mentioned order with the lamp housing 18 on the bottom, and a flat wire 28 is disposed between the lamp housing 18 and the panel support 14. An adhesive tape 29 is preferably attached to the top frame 16 where the top frame 16 contacts the lamp housing 18. Reference numerals 61, 62 and 63 indicate a liquid crystal panel, a reflective plate and a lamp, respectively.

Note that the top frame 16 preferably includes a horizontal portion 16a and a vertical portion 16b. The horizontal portion 16a is coupled to the panel support 14, while the vertical portion 16b is disposed towards the lamp housing 18 and may be in contact with the lamp housing 18.

Figure 1:
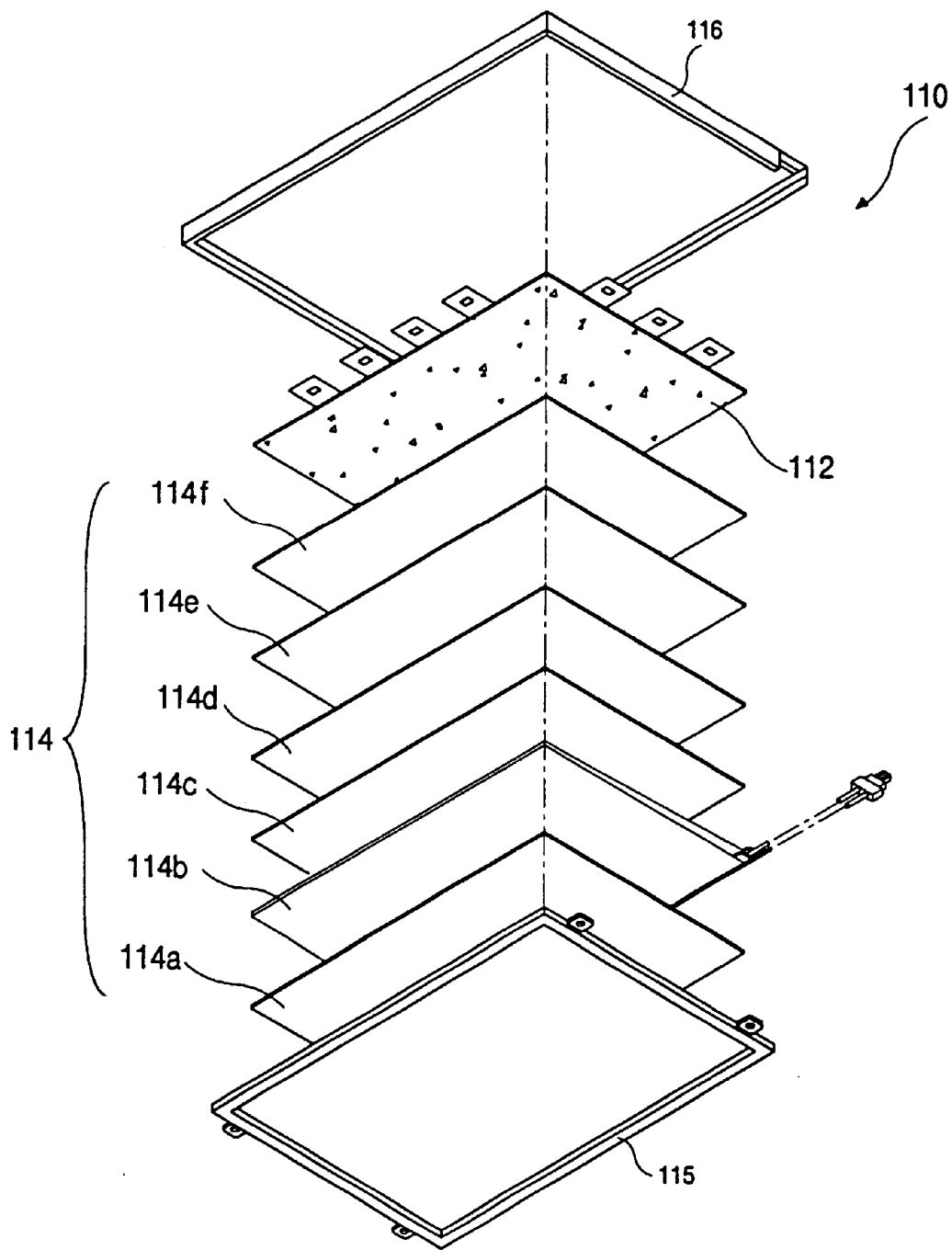
FIG. 1 is an exploded perspective view of a conventional liquid crystal display module.
Figure 2:
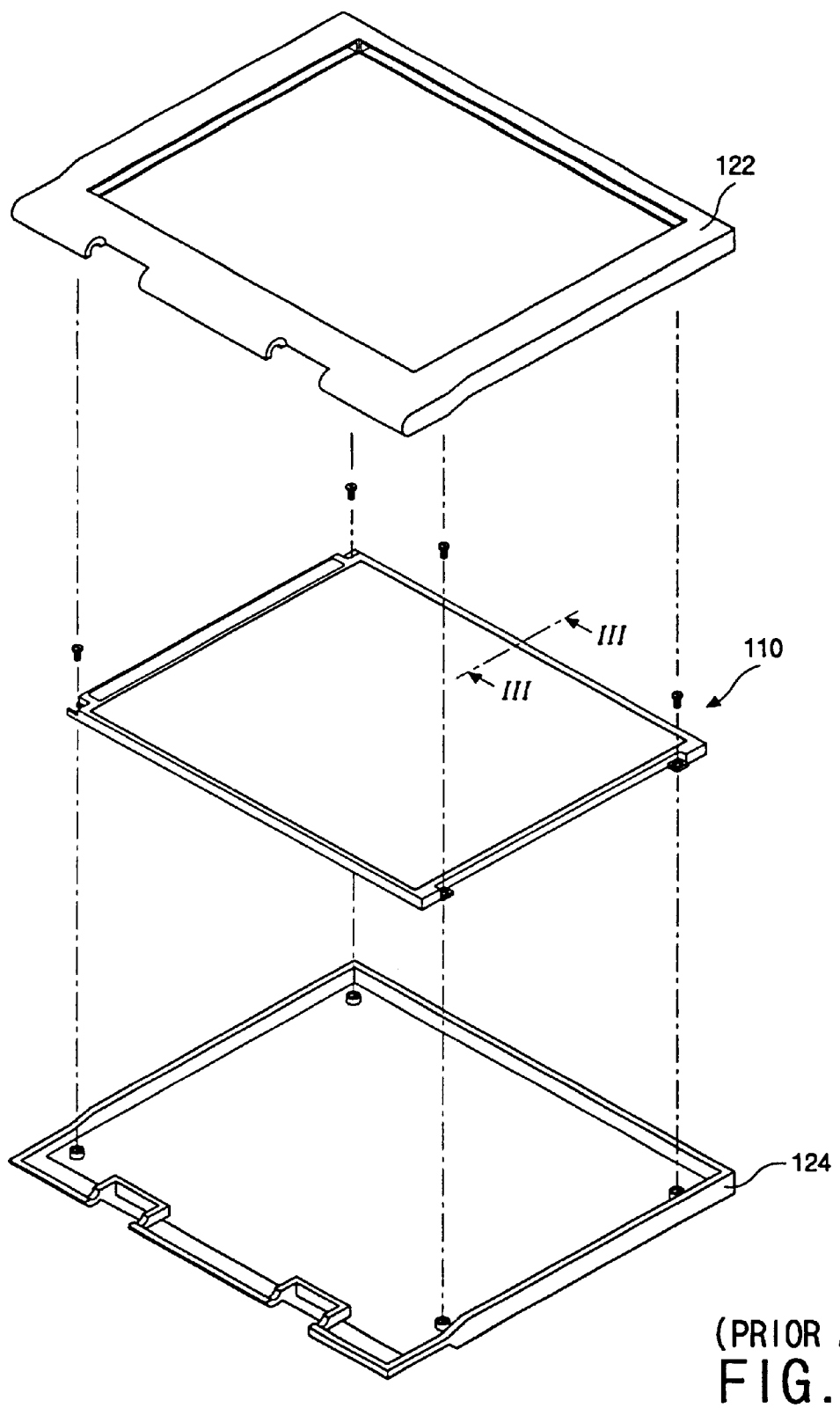
FIG. 2 is an exploded perspective view of a liquid crystal display device that includes the liquid crystal display module shown in FIG. 1.
Figure 3:
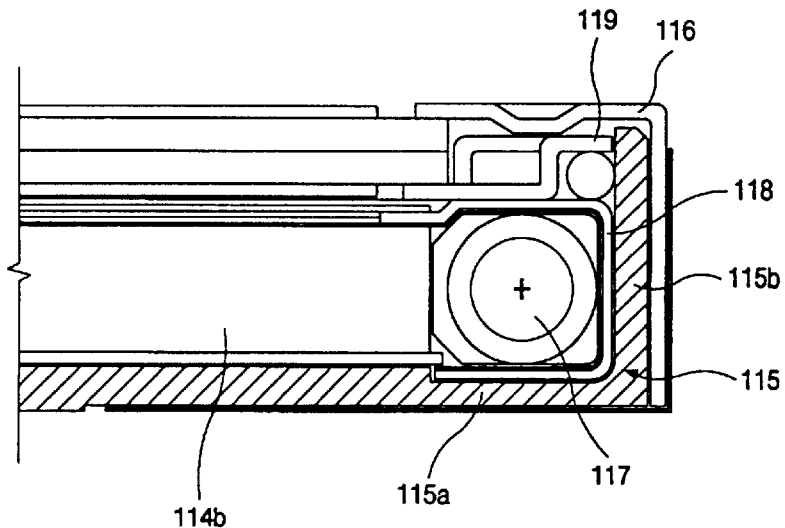
FIG. 3 is a cross-section view taken along the line III—III as shown in FIG. 2.

A comparison of the unique structure of preferred embodiments of the present invention to the conventional structure shown in FIG. 3 reveals the significant space savings and compactness achieved by preferred embodiments of the present invention.

While the invention has been particularly shown and described with reference to preferred embodiments thereof, it will be understated by those skilled in the art that the foregoing and other changes in form and details may be made therein without departing from the spirit and scope of the invention.

What is claimed is:

1. a liquid crystal display module comprising:
    a liquid crystal display panel;
    a main frame having first and second longitudinal members that are substantially parallel with each other and a first lateral member that is substantially perpendicular to the first and second longitudinal members and interconnected at a first end of the first and second longitudinal members such that the first and second longitudinal members and the first lateral member define three sides of the main frame, wherein the liquid crystal panel is disposed on the main frame such that the main frame supports the liquid crystal panel; and
    a lamp housing having a lamp for supplying light to the liquid crystal panel, wherein the lamp housing is coupled to a second end of the first and second longitudinal members such that the lamp housing defines a side of the main frame, and the lamp housing is separable from the main frame.

2. The liquid crystal display module of claim 1, further comprising a top frame coupled to the main frame such that the top frame and the main frame securely support the liquid crystal panel and the lamp housing.

3. The liquid crystal display module of claim 2, further comprising a panel support coupled to the lamp housing and interposed between the lamp housing and the top frame, wherein the panel support compensates for height of the liquid crystal panel.

4. The liquid crystal display module of claim 2, wherein the lamp housing is provided with coupling projections at a first end and a second end of the lamp housing such that the coupling projections are coupled to coupling flanges that are provided at the second ends of the longitudinal frame members.

5. The liquid crystal display module of claim 4, wherein each of the coupling projections includes upper and lower engagement portions, and wherein each of the coupling flanges are screw-coupled to both the upper and lower engagement portions.

6. The liquid crystal display module of claim 5, wherein the lower engagement portion is provided with a first screw hole, the upper engagement portion is provided with second and third screw holes, and the coupling flange is provided with fourth, fifth and sixth screw holes, wherein the fourth screw hole is screw-coupled to the first screw hole, the fifth screw hole is screw-coupled to the second screw hole, and the sixth screw hole is coupled to the third screw hole.

7. The liquid crystal display module of claim 6, wherein the top frame at one end has a coupling flange and the coupling flange is provided with a seventh screw hole such that the seventh screw hole is screw-coupled to the third and sixth screw holes.

8. The liquid crystal display module of claim 7, wherein the coupling flange of the top frame is further provided with an eight and ninth screw hole.

9. The liquid crystal display module of claim 7, wherein the coupling flange of the main frame has a projection that extends upward from the coupling flange of the main frame such that the projection prevents deformation of the coupling flange of the top frame, the coupling flange of the main frame, and the coupling projections of the lamp housing when the coupling flange of the top frame, the coupling flange of the main frame and the projection of the lamp housing are screw-coupled together.

10. The liquid crystal display module of claim 2, wherein the main frame is provided with a bar-shaped guide such that the liquid crystal display panel has support in a lateral direction.

11. The liquid crystal display module of claim 2, wherein a portion of the top frame is in contact with at least a portion of the lamp housing.

12. The liquid crystal display module of claim 11, wherein the portion of the top frame in contact with the lamp housing is attached with an adhesive tape.

13. The liquid crystal display module of claim 3, wherein the panel support is coupled to a horizontal portion of the top frame.

14. A liquid crystal display module comprising:
a liquid crystal display panel;
a main frame arranged to support the liquid crystal panel and having three interconnected frame members defining three sides thereof; and
a lamp housing having a lamp for supplying light to the liquid crystal panel, wherein the lamp housing is arranged to define a fourth side of the main frame, and the lamp housing is separable from the main frame.

15. The liquid crystal display module according to claim 14, wherein the lamp housing is connected to two of the three interconnected frame members of the main frame.

16. The liquid crystal display module according to claim 14, wherein the lamp housing includes connecting members for connecting the lamp housing to the main frame.

17. The liquid crystal display module according to claim 14, wherein the lamp housing and the main frame define an integral, unitary structure.

18. The liquid crystal display module according to claim 14, wherein the main frame is substantially rectangular.

19. The liquid crystal display module according to claim 14, further comprising a top frame coupled to the main frame such that the top frame and the main frame securely support the liquid crystal panel and the lamp housing.

20. The liquid crystal display module of claim 19, further comprising a panel support coupled to the lamp housing and interposed between the lamp housing and the top frame, wherein the panel support compensates for height of the liquid crystal panel.

21. The liquid crystal display module of claim 14, wherein the lamp housing is provided with coupling projections at a first end and a second end of the lamp housing such that the coupling projections are coupled to ends of two of the three frame members.

22. The liquid crystal display module of claim 21, wherein each of the coupling projections includes upper and lower engagement portions, and wherein each of the coupling flanges are screw-coupled to both the upper and lower engagement portions.

23. The liquid crystal display module of claim 14, wherein the main frame is provided with a bar-shaped guide such that the liquid crystal display panel has support in a lateral direction.

24. The liquid crystal display module of claim 19, wherein a portion of the top frame is in contact with at least a portion of the lamp housing.

25. A liquid crystal display module comprising:
a liquid crystal display panel;
a main frame having first and second longitudinal members that are substantially parallel with each other and a first lateral member that is substantially perpendicular to the first and second longitudinal members and interconnected at a first end of the first and second longitudinal members such that the first and second longitudinal members and the first lateral member define three sides of the main frame, wherein the liquid crystal panel is disposed on the main frame such that the main frame supports the liquid crystal panel;
a lamp housing having a lamp for supplying light to the liquid crystal panel, wherein the lamp housing is coupled to a second end of the first and second longitudinal members such that the lamp housing defines a side of the main frame; and
a top frame coupled to the main frame such that the top frame and the main frame securely support the liquid crystal panel and the lamp housing,
wherein the lamp housing is provided with coupling projections at a first end and a second end of the lamp housing such that the coupling projections are coupled to coupling flanges that are provided at the second ends of the longitudinal frame members.

26. The liquid crystal display module of claim 25, wherein each of the coupling projections include upper and lower engagement portions, and wherein each of the coupling flanges are screw-coupled to both the upper and lower engagement portions.

27. The liquid crystal display module of claim 26, wherein the lower engagement portion is provided with a first screw hole, the upper engagement portion is provided with second and third screw holes, and the coupling flange is provided with fourth, fifth and sixth screw holes, wherein the fourth screw hole is screw-coupled to the first screw hole, the fifth screw hole is screw-coupled to the second screw hole, and the sixth screw hole is coupled to the third screw hole.

28. The liquid crystal display module of claim 27, wherein the top frame at one end has a coupling flange and the coupling flange is provided with a seventh screw hole such that the seventh screw hole is coupled to the third and sixth screw holes.

29. The liquid crystal display module of claim 28, wherein the coupling flange of the top frame is further provided with an eighth and ninth screw hole.

30. The liquid crystal display module of claim 28, wherein the coupling flange of the main frame has a projection that extends upward from the coupling flange of the main frame such that the projection prevents deformation of the coupling flange of the top frame, the coupling flange of the main frame, and the coupling projections of the lamp housing when the coupling flange of the top frame, the coupling flange of the main frame and the projection of the lamp housing are screw-coupled together.

31. A liquid crystal display module comprising:

a liquid crystal display panel;

a main frame arranged to support the liquid crystal panel and having three interconnected frame members defining three sides thereof; and a lamp housing having a lamp for supplying light to the liquid crystal panel, wherein the lamp housing is arranged to define a fourth side of the main frame;

wherein the lamp housing is provided with coupling projections at a first end and a second end of the lamp housing such that the coupling projections are coupled to ends of two of the three frame members.

32. The liquid crystal display module of claim 31, wherein each of the coupling projections includes upper and lower engagement portions, and wherein each of the coupling flanges are screw-coupled to both the upper and lower engagement portions.

* * * * *